UNITED STATES PATENT OFFICE.

CARL COWEN SCHIRM, OF BERLIN, GERMANY, ASSIGNOR OF ONE-HALF TO ALBERT SILBERMANN, OF SAME PLACE.

METHOD OF ENAMELING ON SILVER-LEAF.

SPECIFICATION forming part of Letters Patent No. 635,901, dated October 31, 1899.

Application filed October 30, 1896. Renewed May 26, 1899. Serial No. 718,421. (No specimens.)

*To all whom it may concern:*

Be it known that I, CARL COWEN SCHIRM, a subject of the King of Prussia, German Emperor, and a resident of Berlin, in the Kingdom of Prussia, German Empire, have invented a certain new and Improved Method of Enameling on Silver-Leaf, of which the following is a full, clear, and exact description.

Hitherto it has only been possible to underlay enamel with silver-leaf, in order to increase its illuminative powers, on a very small scale, owing to the fact that in the case of larger surfaces the size employed to attach the silver grounding to the substance to be enameled when fired rises up, forming blisters and creases under and in the silver-leaf. This produces a very pretty and lively effect in the case of small surfaces, but prevents the manufacture of large even surfaces, as necessary for the larger class of paintings. Then again large surfaces could not be coated with this class of enamel because the thin copperplate forming the back of the same warps when fired, which has to be done several times, forming blisters, so that it is not possible to attain even surfaces which could be fitted together to form a whole. The employment of thick copperplates is entirely precluded because the same expand to such an extent when heated that they entirely ruin the enamel. Even at the ordinary temperature they crack the enamel.

The object of the present invention is to produce an even silver coating for underlaying transparent enamels formed on plates which will not warp at the temperature necessary for firing the enamel and the expansion and contraction of which is so small that it is not sufficient to crack the enamel coating.

In carrying out my invention I provide a cast-iron plate with an enamel grounding and then provide the same with a coating of binding material, such as gum or other suitable substance, whereon the silver-leaf is placed, which is prepared in the manner hereinafter described. The silver-leaf is laid on a fine wire-netting covered with cloth and then a thick sheet of caoutchouc is covered over the same and the whole subjected to a high pressure in a suitable press. Thus the caoutchouc or rubber sheet will press the silver-leaf into the interstices of the netting, producing in the same innumerable fine rents or cracks. If the silver-leaf is now placed onto the plate, which is provided with the binding medium, the products of combustion of the latter when the plate is fired will be able to pass off through the cracks in the silver-leaf, which melts without forming blisters and forms a surface corresponding to the wire-netting—*i. e.*, a surface consisting of a number of small panes. The curvature of these panes produces great brilliancy and is well adapted to receive the enamel. The cast-iron does not alter its form even when fired several times. It expands so slightly and so slowly when heated that the enamel will not crack, and it cools so slowly that the enamel is rendered stronger and less liable to crack, as is the case with well-cooled glass.

I claim as my invention—

The process of enameling on silver-leaf, consisting in producing a silver-leaf with minute perforations, applying such leaf on a suitable base, the perforations permitting the air or gases to escape from between the surfaces of the leaf and base, and enameling said silver-leaf, substantially as described.

In testimony whereof I have signed this specification in the presence of two subscribing witnesses.

CARL COWEN SCHIRM.

Witnesses:
 WALD. HAUPT,
 HENRY HASPER.